Patented June 20, 1944

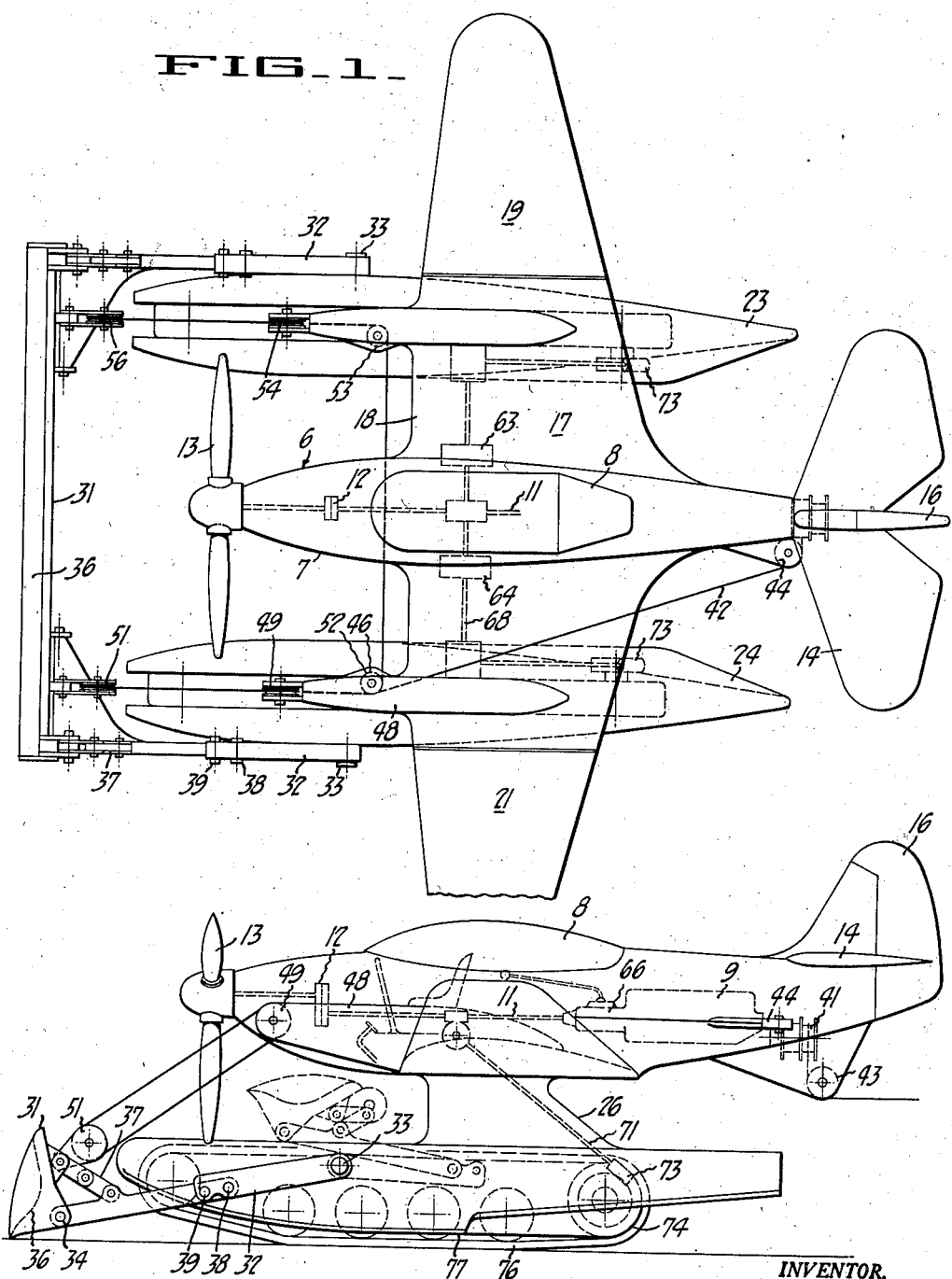

2,351,799

UNITED STATES PATENT OFFICE 2,351,799

BULLDOZER

Ellsworth W. Austin, Cedar Rapids, Iowa, assignor to La Plant-Choate Mfg. Co., Inc., Cedar Rapids, Iowa, a corporation of Delaware Application October 3, 1942, Serial No. 460,707

7 Claims. (Cl. 37—144)

My invention is particularly concerned with a bulldozer for special use under wartime conditions and is designed for rapid transportation, quick adaption for use, and ready action in clearing trails, paths, roadways and the like in remote territory.

While there are related or parallel instances in peacetime, still in wartime there is an especial need for an implement which will be readily available to clear new roads and trails so that motorized ground equipment can readily penetrate previously unprepared country, and which unit will be readily transportable at great speed and be quickly operable upon arriving at the desired destination.

It is therefore an object of my invention to provide a bulldozer which is transportable by means of an airplane.

Another object of my invention is to provide a bulldozer which can be utilized on its transporting means without the necessity of disassembly or reassembly on a new mount.

Another object of my invention is to provide a bulldozer which can be disposed on an airplane not only for the customary work of bulldozing, but likewise for transport without interfering unduly with the airplane's flight characteristics.

Another object of my invention is to provide a bulldozer which can be advanced in its operating position by ground-engaging means or air-engaging means.

Another object of my invention is to provide a bulldozer of such characteristics that while readily able to withstand the strains and stresses of bulldozer operation, it is still light enough for air transport.

A further object of my invention is to provide a bulldozer vehicle which is not only capable of flight, but is readily maneuverable by ground-driving means.

Additional objects of the invention are obtained in the embodiment of the invention illustrated in the drawing, in which—

Fig. 1 is a plan of a bulldozer constructed in accordance with my invention.

Fig. 2 is a side elevation of the mechanism shown in Fig. 1 and portions of both showings being somewhat diagrammatic.

In its preferred form the bulldozer of my invention comprises an air frame designed to be propelled by an air screw from a source of power and having likewise a ground-engaging support structure to which a foldable bulldozer frame is movably attached. The supporting wing of the air frame is of substantially the same width as the bulldozer blade so that the vehicle can progress through newly cleared country and there are provided means for maneuvering the vehicle on the ground by means of engine power which otherwise is diverted to drive the air screw. In addition, power is derived from the engine to operate a winch or comparable mechanism for altering the position of the bulldozer.

In its preferred form, the bulldozer of my invention comprises an air frame generally designated 6 which includes a fuselage 7 having an operator station 8 therein, and likewise housing a propulsion motor 9 which ordinarily is connected by a drive shaft 11 and reduction gearing 12 to an air screw 13, or propeller. The fuselage is provided with the customary control surfaces 14 and 16 and is fabricated integrally with an air support or wing 17 having a center section 18 of predetermined width.

In order to have sufficient supporting wing surface, but in order to limit the total width of the structure under certain circumstances, the wing 17 is provided with wing ends 19 and 21 which fold back over and upon the wing center section 18 in a well known fashion, so that during flight the wing extensions 19 and 21 are extended; whereas, during ground operation if desired the wing extensions 19 and 21 are folded back to reduce the overall width of the vehicle to substantially that of the center section 18.

The air frame likewise includes supporting means effective upon the water and these comprise a pair of elongated pontoons or floats 23 and 24, respectively, arranged on opposite sides of the longitudinal center line of the air frame. The floats are of the customary construction and are connected with the remainder of the air frame by intervening streamlined struts 26, preferably of hollow construction.

As so far described, the air frame and propulsion mechanism are substantially standard and constitute a unit which is capable of rapid flight through the air. In accordance with my invention, I provide a bulldozer mechanism generally designated 31 to cooperate with the air frame structure.

Suitably mounted on each of the floats 23 and 24 is a push beam structure 32 which at one end is connected by a horizontal pivot 33 to the adjacent float and adjacent its other end is connected by a horizontal pivot 34 to a transversely extending bulldozer blade 36 having a width substantially the same as that, or slightly greater than that of the wing center section 18. The bulldozer blade 36 is connected to the strut structure 32 by means of collapsible braces 37 and the strut structure itself is provided intermediate its ends with a horizontal pivot pin 38 and a locking structure 39. These means permit the strut structure to be extended as a push beam of a rigid nature, as illustrated in full lines in Fig. 2, disposed well ahead of the air screw 13, and well ahead of the floats 23 and 24. In this position the general weight of the bulldozer structure is well in advance of that of the remaining part of the structure. Upon suitable manipulation of the locking structure and collapse of the braces 37 into a folded position (as shown in dotted lines in Fig. 2), the mechanism is collapsed from its extended position and the weight of the bulldozer mechanism is more nearly adjacent the center of support, either of the floats or of the wing structure 17. That is, the bulldozer 31 is movable from a forward position ahead of the remaining part of the structure into another position above the floats 23 and 24 and much closer to the center of support of the mechanism.

For moving the bulldozer when it is locked rigidly in its extended position in a vertical plane about the horizontal axis of the pivot 33, I preferably drive by a disengageable connection with the motor 9 a power control unit or winch mechanism 41, the weight of which is preferably disposed at the rearward portion of the fuselage for better balance. From this extends an operating cable 42. The cable can be passed around a pulley 43 disposed so that the cable can be led off to a point of anchorage for towing purposes; or in the alternative, the cable 42 can be extended around a lateral pulley 44 (especially as shown in Fig. 1) over a guide pulley 46. This guide pulley is one of several and is located in one of a pair of support members 48 which extend longitudinally of the mechanism and forwardly of the leading edge of the wing 17 to serve as supports for the cable 42.

At the front end of each of the supports 48 there is provided a pulley group 49 over which the cable 42 passes and from whence it extends around a pulley 51 pivoted on the back of the bulldozer blade 36. From the pulley 51 the cable then extends back over another pulley of the group 49 over a secondary guide pulley 52 associated with the pulley 46; thence transversely of the air frame to a similar guide pulley 53 on the companion support structure 48, over a pulley 54 at the front end of such companion support structure, around a pulley 56 on the bulldozer blade 36 corresponding to the pulley 51, and thence back to a point of anchorage on the companion support 48.

With this arrangement and when the push beams 32 are rigid, manipulation by the operator of the power control unit 41 in the customary fashion either takes in, pays out, or holds the cable 42 and the bulldozer blade structure 31 is swung in a vertical arc with substantially equal forces being imposed on both sides of the bulldozer structure. Thus, the bulldozer can be raised and lowered in the customary fashion by power. When, however, the locking structure 39 is released and the collapsible braces 37 are buckled, the cable 42 is useful in conjunction with the power control unit for moving the bulldozer structure 31 from the full line operating position shown in Fig. 2 into the dotted line transport position shown in such figure. If the cable 42 is disconnected from the bulldozer it can be utilized for towing purposes ahead of the vehicle by reaving it over the pulley group 49 or by reaving it over the pulley 43 for towing purposes to the rear.

In order properly to operate the vehicle on land and to control the operation of the bulldozer once it has been extended into its operation position, there is provided in accordance with my invention means for supporting, advancing and steering the vehicle on land. From the motor drive shaft 11 a branch shaft 62 extends to a pair of separately operable steering clutches 63 and 64. The arrangement preferably is such that as controlled by the operator, the engine 9 when effective to drive the propeller 13 is disconnected from the steering clutches 63 and 64 and is ineffective to drive them, but in the alternative the engine 9 can be disconnected from the propeller 13 and is then effective to drive the steering clutches 63 and 64, preferably through the medium of a change speed transmission 66, likewise controllable by the operator. The clutches 63 and 64 are individually under the control of an operator and include not only clutch mechanisms, but likewise individually controllable brakes.

From each of the clutches 63 and 64 the drive is taken by shafts 68 and bevel gearing 69 to drive shafts 71 extending through the hollow structure 26 to a suitable final drive gearing 73 located within the floats or pontoons 23 and 24, respectively, and there engaging with a drive sprocket 74 capable of driving endless jointed track mechanisms 76 supported on trucks 77 contained within and adapted to support each of the floats 23 and 24. The tracks 76 are of the customary ground-engaging type. With the arrangement described the operator can drive either one or both of the tracks 76 and can brake them individually so that the vehicle as a whole is advanced or steered by such means.

In the general operation of this bulldozer and for flight from a base, for example, the parts are put into position substantially as shown in dotted lines in Fig. 2, and in addition the bulldozer blade structure 36 can be provided with a fairing or streamlined cover for better flight characteristics. The air frame takes off from the water on its float supports 23 and 24 with the air screw 13 connected to the motor 9 and the rest of the driving structure disconnected. Upon arrival at substantially its destination, the air frame alights upon the water on the floats 23 and 24 and, still utilizing the propeller 13, taxies to a landing ramp or beach. If the tracks 76 are permitted to run free it is possible to beach the craft by utilizing the air screw 13 and all maneuvers up to this point in the nature of steering are accomplished by the control surfaces 16 and 14.

Upon beaching of the craft, the wing ends 19 and 21 are folded in, the bulldozer structure 31 is moved from its dotted line position (as shown in Fig. 2) into its full line position, the braces 37 and push beams 32 are locked in their extended rigid position, and the cable 42 from the power control unit 41 is reaved over the appropriate pulleys as described to afford connection with the bulldozer structure. Then the vehicle is advanced into the undergrowth which is to be cleared or into the territory where the road or trail is to be provided, and this can be accomplished either by the use of the air screw 13 with accompanying control by the rudder 16, or can be accomplished by disengaging the air screw from the engine 9 and engaging selectively by means of the clutches 63 and 64 either or both of the track mechanisms 76. The latter type of operation is customary and the vehicle is then advanced at customary tractor speed during which the bulldozer blade 36 is raised and lowered and otherwise operated to clear land, to construct a trail or roadway, to level uneven ground, or the like. For some uses, particularly building trails or narrow roadways, it is not necessary that the blade 36 be strictly transverse of the longitudinal center line of the structure, but the blade can be angled to one side or the other in the nature of the customary trail builder or angledozer, and the use of the term "bulldozer" herein is intended to refer to virtually any type of comparable implement.

Upon completion of the bulldozing operation, the vehicle can be returned to its water borne condition, resting upon the floats 23 and 24, the bulldozer can be retracted into its dotted line position as shown in Fig. 2, the transmission 66 and steering clutches 63 and 64 can be disconnected from the motor 9, the air screw 13 can be re-engaged, and the vehicle can be taken off and flown to its base or to another site. With this arrangement pioneering equipment such as a bulldozer, trailbuilder and the like is transported very rapidly from a base, over hundreds or thousands of miles to a new area which can be quickly provided with temporary trails or permanently leveled land by pioneering equipment, ready upon landing at any selected spot for instant, effective use.

I claim:

1. A bulldozer comprising an air frame adapted to run upon the ground and to fly in the air, a bulldozer blade, and means for mounting said bulldozer blade upon said air frame to move from a position ahead of the forward portion of said air frame and remote from the center of gravity thereof to a position behind the forward portion of said air frame and near the center of gravity thereof.

2. A vehicle comprising an air frame including a supporting wing and a supporting flat structure, a pair of ground engaging elements for supporting said air frame disposed on opposite sides of the longitudinal center thereof, an air screw on said air frame, an engine, means for selectively coupling said engine to said air screw or to either of said ground engaging elements and a bulldozer blade articulated to said vehicle and arranged to assume an operative position in advance of said supporting float structure and an inoperative position overlying said supporting float structure.

3. A bulldozer comprising: a float structure; a bulldozer blade articulated to said float structure and arranged to occupy a working position in advance of said float structure or an inoperative position overlying said float structure; and means carried by said float structure for selectively advancing said float structure through the water or over the ground.

4. A bulldozer comprising: a float structure; an air frame supported by said float structure; a propeller associated with said air frame; power means for selectively driving said float structure over the ground or imparting rotation to said propeller and a working implement articulated to said float structure and arranged to occupy a working position in advance of said float structure or an inoperative position overlying said float structure.

5. A bulldozer comprising: a float structure; an air frame supported by said float structure, said air frame including a supporting wing having a central section of a width substantially equal to the over all width of said float structure and end sections hinged thereto, and arranged to assume an operative position substantially coplanar with said central section or an inoperative position overlying said central section; a propeller associated with said air frame; power means for selectively driving said float structure over the ground or imparting rotation to said propeller; and a working implement articulated to said float structure, and arranged to occupy a working position in advance of said float structure or an inoperative position overlying said float structure.

6. A bulldozer comprising: a float structure; an air frame formed integral therewith, said air frame including a supporting wing having a central section of a width substantially equal to the over all width of said float structure and end sections articulated thereto, and arranged to assume an operative position substantially coplanar with said central section and an inoperative position overlying said central section; a propeller associated with said air frame; power means for selectively driving said float structure over the ground or imparting rotation to said propeller; a working implement articulated to said float structure and arranged to occupy a working position in advance of said float structure or an inoperative position overlying said float structure; and means associated with said power means for adjusting the position of said working implement with respect to said float structure.

7. A vehicle comprising: an air frame; a float structure carried by said air frame; a bulldozer blade articulated to said vehicle for assuming a working position forward of said supporting float structure and an inoperative position overlying said supporting float structure; and power means for propelling said vehicle over the ground or through the air or water.

ELLSWORTH W. AUSTIN.